June 20, 1967  J. E. SIGLER  3,326,729
EPITAXIAL METHOD FOR THE PRODUCTION OF
MICROCIRCUIT COMPONENTS
Filed Aug. 20, 1963  2 Sheets-Sheet 1

INVENTOR.
JOHN E. SIGLER,
BY
John M. Koch
ATTORNEY.

June 20, 1967
J. E. SIGLER
3,326,729
EPITAXIAL METHOD FOR THE PRODUCTION OF MICROCIRCUIT COMPONENTS
Filed Aug. 20, 1963
2 Sheets-Sheet 2
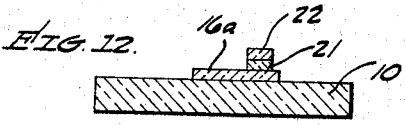
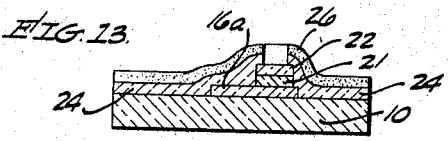
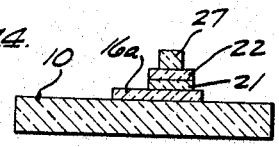
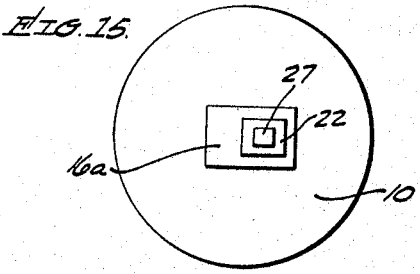
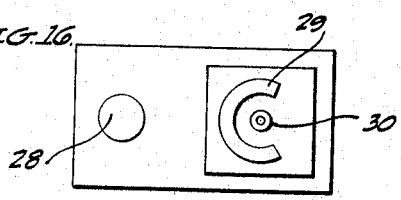
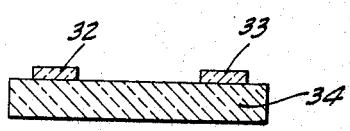
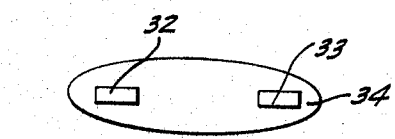
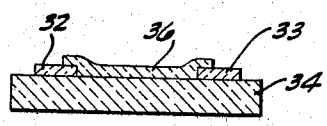
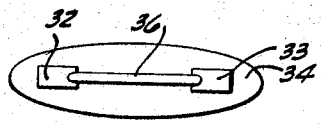
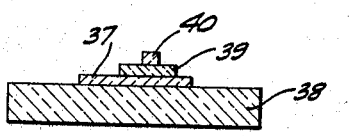
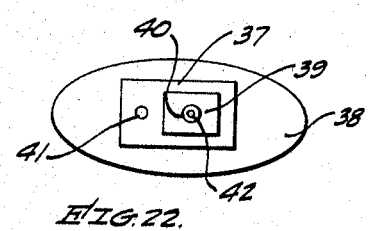
INVENTOR.
JOHN E. SIGLER,
BY John M. Koch
ATTORNEY.

United States Patent Office 3,326,729
Patented June 20, 1967

3,326,729
EPITAXIAL METHOD FOR THE PRODUCTION OF MICROCIRCUIT COMPONENTS
John E. Sigler, Costa Mesa, Calif., assignor to Hughes Aircraft Company, Culver City, Calif., a corporation of Delaware
Filed Aug. 20, 1963, Ser. No. 303,229
8 Claims. (Cl. 148—175)

This invention relates to the production of semiconductor devices, and particularly to microcircuit units or components by the use of a complete epitaxial procedure.

Prior art methods for the production of semiconductor devices and microcircuit units are employed which include expitaxial depositions, both single and multiple layers, the use of oxide masks, diffusions and controlled etching. Among the disadvantages of the prior art methods are the overdoping disadvantage of multiple diffusions, graded junctions and limited resistivity ranges of layers allowed in multiple diffusions. Prior art methods permit epitaxial depositions only in specified locations on a substrate slice.

Accordingly, it is a principal object of this invention to provide a complete epitaxial method for the production of semiconductor devices or microcircuit units incorporating semiconductor components.

Another object of this invention is to make available to the device designer all the possible design configurations which are possible using epitaxial techniques such as multiple layers of any resistivity, type, thickness or impurity profile, for the construction of microcircuits.

By using the procedure of this invention, new device designs such as controlled rectifiers and tunnel diodes can be incorporated in microcircuits. Some layers desired in device fabrication are so thin that it is difficult to remove layers thereabove so that one can make contact to the desired layer. The method of this invention permits one to make a contact pad as a part of the layer without having a deposit above this layer which must be removed at a later time.

Stated in general terms, the objects of this invention are attained by providing a process for the complete epitaxial production of semiconductor devices which comprises the steps of epitaxially depositing an oxide film, such as a film of silicon dioxide, and etching holes in the oxide film, by the use of a photo masking method, which includes photoresist developing and oxide removal in specific areas. The resulting substrate, with its superimposed masks, is then placed in a suitable epitaxial reactor and a layer of silicon is epitaxially deposited on the structure. The silicon deposits epitaxially in those areas free of oxide film, and deposits in polycrystalline form in the area where the oxide film covers the surface of the structure. The resulting structure is immersed in hydrofluoric acid to remove the oxide film and its polycrystalline over-growth. These steps are repeated as often as is necessary to produce the structure desired in the completed semiconductor device. Resistors, diodes and capacitors are made in accordance with this procedure in a manner similar to that for producing the bottom control pattern.

A more detailed description of a specific embodiment of the invention is given below with reference to the accompanying drawings, wherein:

FIG. 12 is a similar view showing the structure of FIG. 11 after removal of the oxide layer and the polycrystalline silicon layer;

FIG. 13 is a similar view of the structure of FIG. 12 after recoating the same with silicon dioxide, developing a third pattern and preparing the structure to receive the emitter deposit;

FIG. 14 is a similar view showing the structure of FIG. 13 after deposition of the emitter deposit and the removal of the oxide layer and the polycrystalline silicon layer;

FIG. 15 is a plan view of the structure of FIG. 14;

FIG. 16 is a similar view showing the structure of FIG. 15 after the addition of a protective coating of oxide and the etching of contact holes;

FIG. 17 is the vertical sectional view showing an early stage in the production of a resistor in accordance with the method of the invention;

FIG. 18 is a plan view of the structure of FIG. 17;

FIG. 19 is a vertical sectionol view showing the completed resistor;

FIG. 20 is a plan view of the structure shown in FIG. 19;

FIG. 21 is a vertical sectional view showing the structure of a diode produced in accordance with the method of the invention; and FIG. 22 is a plan view of the structure shown in FIG. 21.

Figure 1:
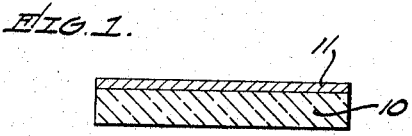
FIG. 1 is a vertical sectional view showing a p-type substrate slice of silicon coated with a layer of silicon dioxide.

A p-type slice of silicon 10 having a high resistivity, such as about 20 ohm centimeters is coated with silicon dioxide 11 by depositing silicon dioxide thereon from a gas stream containing tetraethylorthosilicate. The thickness of this oxide layer 11 is made to be about 10,000 to about 20,000 A. At this stage of the process the structure produced is illustrated in FIG. 1 of the accompanying drawings.

Figure 2:
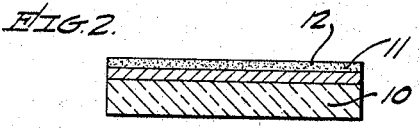
FIG. 2 is a similar view showing the addition of a layer of Kodak Metal Etch Resist upon the structure of FIG. 1.
Figure 3:
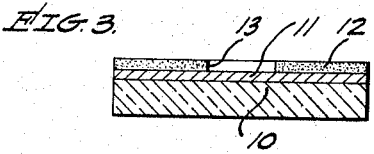
FIG. 3 is a similar view showing the structure of FIG. 2 after masking, exposure and development thereof.
Figure 4:
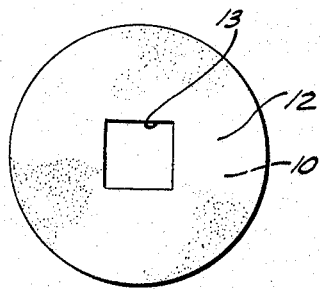
FIG. 4 is a plan view of the structure of FIG. 3.

Then is applied a coating of photoresist material 12, such as Kodak Metal Etch Resist, sold on the market by the Eastman Kodak Company of Rochester, N.Y. The structure at this stage is represented in FIG. 2. The upper surface 12 of the resulting structure is exposed to ultraviolet light under a photoresist mask of the desired pattern. The exposed resist then is developed to produce a structure such as that shown in FIG. 3, in cross section, and FIG. 4, in plan view, containing a central aperture 13 through the resist layer 12.

Figure 5:
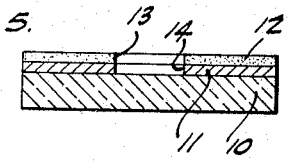
FIG. 5 is a vertical sectional view of the structure of FIGS. 3 and 4 after being subjected to the action of a hydrofluoric acid etch solution.
Figure 6:
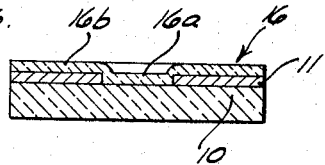
FIG. 6 is a similar view after the removal of the photoresist layer from the structure of FIG. 5 and the deposition thereon of an epitaxial layer of n-type silicon.

The resulting structure is placed in a hydrofluoric acid etch solution until the thus exposed portion of the silicon dioxide layer is removed to produce the structure illustrated in FIG. 5, containing an aperture 14 through silicon dioxide layer 11 coinciding with hole 13 through resist layer 12. The resist layer 12 then is removed from the structure in accordance with instructions supplied by the manufacturer of the photoresist material. The resulting structure then is placed in an epitaxial reactor and an epitaxial film of n-type silicon 16 about 10 microns thick and having a resistivity of about .01 ohm centimeter is deposited thereon. The resulting structure is illustrated in FIG. 6. The film of n-type silicon 16 is of single crystal structure in the area 16a where it contacts the silicon substrate 10 and is polycrystalline in structure in the area 16b where it is deposited on the oxide layer 11.

Figure 7:
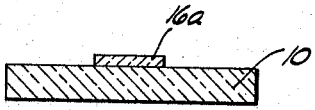
FIG. 7 is a similar view of the structure of FIG. 6 after subjecting the same to a hydrofluoric acid etch solution.

The resulting structure is immersed in hydrofluoric acid etch solution to dissolve the silicon dioxide layer 11. This takes about 24 to 72 hours and is aided by the addition of small amounts of a suitable detergent and/or by the use of ultrasonic agitation. The hydrofluoric acid etch solution dissolves the silicon dioxide layer 11 and the upper polycrystalline silicon layer 16b is broken from the structure when its support is thus removed. The resulting structure is shown in FIG. 7.

Figure 8:
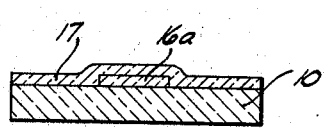
FIG. 8 is a similar view of the structure of FIG. 7 after decoating the same with an oxide layer.
Figure 9:
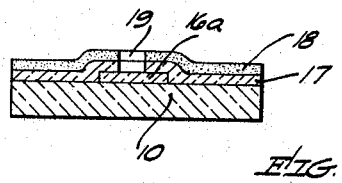
FIG. 9 is a similar view of the structure of FIG. 8 after the application of photoresist, development of a pattern thereon, and removal of excess photoresist and the oxide layer.
Figure 10:
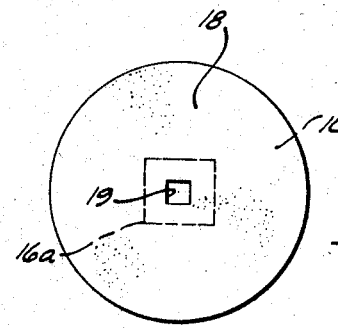
FIG. 10 is a plan view of the structure of FIG. 9.

The resulting structure is again coated with silicon dioxide 17 by using the process described hereinabove to produce a structure shown in FIG. 8. The resulting structure is then coated with photoresist 18 such as Kodak Metal Etch Resist, and is provided with a mask. The resulting assembly is exposed to ultraviolet light and developed as described hereinabove to produce a second pattern containing a central aperture 19 through layers 17 and 18, as shown in FIGS. 9 and 10.

Figure 11:
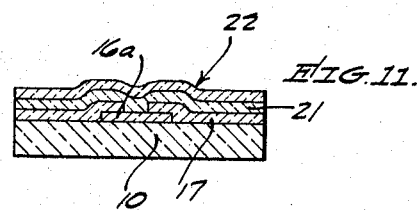
FIG. 11 is a vertical sectional view of the structure of FIGS. 9 and 10 after the removal of photoresist and the deposition thereon of a layer of n-type silicon and a layer of p-type silicon.

The excess of photoresist 18 is removed as previously described, and the silicon dioxide 17 only in the hole area is removed in hydrofluoric acid etch solution, as described hereinabove. The remainder of the photoresist is removed as previously described and the resulting structure is placed in a multi-deposit epitaxial reactor. A layer of n-type silicon 21 is deposited epitaxially upon the resulting structure to a thickness of 5 microns and a resistivity of about 1 ohm centimeter. Immediately thereafter a layer of p-type silicon 22 is deposited epitaxially upon the resulting structure to a thickness of about 2 microns and with a resistivity of about .1 ohm centimeter. The structure of the resulting slice is shown in FIG. 11.

This structure is again treated in a hydrofluoric acid etch solution, to dissolve the silicon dioxide and the polycrystalline silicon supported on the silicon dioxide layer 17. The resulting structure is shown in FIG. 12. At this stage the collector contact 16a, the collector 21, and the base 22 of the transistor structure desired has been formed upon the p-type silicon substrate 10.

This structure is recoated with silicon dioxide 24 as described hereinabove, a third pattern is formed thereon with the aid of Kodak Metal Etch Resist 26, also as previously described, and the resulting structure is prepared to receive the emitter deposit. This structure is shown in FIG. 13. At this stage the resulting structure is again placed in an epitaxial reactor and the emitter deposit is formed thereon. The emitter deposit is a layer 27 of n-type silicon about 3 microns thick. After this epitaxial deposition, the silicon dioxide is again dissolved from the structure in hydrofluoric acid etch solution. The unsupported polycrystalline silicon layer then is broken off from the structure, as described hereinabove. The resulting structure is shown in FIG. 14 in vertical section and in FIG. 15 in plan.

A protective coating of silicon dioxide is formed at this stage to a thickness of about 20,000 to 30,000 A. Holes are etched in the oxide with the acid of photoresist, as described hereinabove, at the regions where it is desirable to make contact to the resulting transistor; namely, collector contact 28, emitter contact 29, and base contact 30, respectively, as shown in FIG. 16. This completes the formation of the transistor.

More than one such transistor structure can be formed on a single substrate slice of p-type silicon. Also, the resulting transistor, or transistors, can be interspersed with resistors and diodes to form a microcircuit. Furthermore, if it is desired that several transistors formed on a single slice of substrate should have a common collector contact, it will be seen that such a structure can be made without difficulty by the use of the method of this invention. In addition, interconnections between various devices formed on a single substrate slice can be made by the use of conventional procedures, such as by evaporating an aluminum film thereon followed by etching the undesired aluminum from the structure, such as is done on a printed circuit board.

The base and collector regions should be formed in quick succession in the above described method of this invention so that the junction formed will be the best that can be made. The amount of time at which the structure is maintained at a high temperature should be kept to a minimum to prevent undesired movement of doping materials, and the various silicon layers which have been deposited on the structure.

Typical deposition conditions for an epitaxial deposit are as follows:

5 to 20 liters per minute of hydrogen
.5 to 2% silicon tetrachloride vapor in hydrogen
1100 to 1250° C. surface temperature of slice
5 to 20 minutes heating at 1100 to 1250° C. in hydrogen gas before deposition
Deposition at the rate of .1 to 3 microns per minute To produce a resistor structure having a resistive element and a contact at each end, one proceeds as follows in accordance with the invention. The contacts at each end of the resistive element are produced by forming contact pads, or collector contacts, for resistors or diodes. Using the silicon dioxide, Kodak Metal Etch Resist, masking, etc., steps outlined in the specific example given hereinabove, to the formation of a transistor, two n-type silicon contact pads 32 and 33, having a resistivity of .01 ohm centimeter are deposited upon a slice of p-type silicon 34, having a resistivity of 20 ohm centimeters, in an epitaxial reactor to produce deposits about 10 microns thick. After removal of the polycrystalline deposit and the oxide masking, the resulting structure has the appearance shown in FIG. 17 in vertical section and in FIG. 18 in plan. Another oxide coating, masking with Kodak Metal Etch Resist, and an epitaxial deposit of n-type silicon 36 of desired resistivity and thickness is employed to produce a resistor having the desired resistance value. After the removal of the oxide layer and the polycrystalline silicon, the structure shown in cross section in FIG. 19 and in plan in FIG. 20 is obtained.

The resistance value of the resulting resistor produced will depend upon the resistivity of the silicon deposited, the thickness of the deposit, the width of the deposition area, and the length of the deposit between the conductor pads. The path between the conductors need not of necessity be a straight path, but can be of any desired shape. Tolerances on deposited resistors will depend upon the degree of control of the epitaxial deposition of the resistance film. In microcircuits most resistors are used as voltage dividers and the voltage division on a slice of the substrate is primarily a function of the area of the various resistors. The absolute value of the resistor is not as important, generally, as this ratio.

A diode is produced in accordance with the method of this invention by the use of the following procedure. A base contact 37 of n-type silicon of .01 ohm centimeter resistivity is deposited on a p-type slice of silicon 38 of 20 ohm centimeter resistivity as described above in the previous specific examples. Using a second masking and deposition step, a double deposit of layers 39 and 40 then is placed on top of the resulting structure. The diode is made of n-type silicon 39 having a thickness of about 10 microns and a resistivity of about 1 ohm centimeter with a p-type deposit of silicon 40 placed on top having a thickness of about 3 microns and resistivity of about .01 ohm centimeter. The final assembly thus produced is shown in FIG. 21 in cross section and in FIG. 22 in plan view. Holes 41 and 42 then are etched in the final protective oxide cover for making contacts to the silicon diode structure in the desired points.

Controlled rectifiers or tunnel diodes are produced in a similar manner, in accordance with the method of this invention, as specifically described hereinabove, with reference to the production of a transistor, resistor, and a diode. Various combinations of transistors, resistors, and diodes can be produced in accordance with the method of this invention upon a single substrate slice and transconnected as desired to give circuit functions. This interconnection is accomplished by using conventional evaporation techniques, as described hereinabove, in connection with the production of the transistor.

Obviously many other modifications and variations of the present invention are possible in the light of the above teachings. It is therefore to be understood that, within the scope of the appended claims, the invention can be practiced otherwise than as specifically described.

What is claimed is:

1. An epitaxial method for the production of semiconductor devices which comprises the steps of depositing an oxide film upon a suitably doped semiconductor substrate slice, etching a hole in the oxide film through a mask, epitaxially depositing a suitably doped layer of the semiconductor on the resulting structure, the layer of semiconductor depositing in polycrystalline form over the area of the oxide film and epitaxially over the area of the hole free of oxide film, removing the oxide film and the polycrystalline over-growth thereof by immersing the structure in an etching solution, the resulting structure consisting of a suitably doped semiconductor substrate and a suitably doped epitaxially deposited layer of the semiconductor, and repeating these steps as many times as desired to produce the desired device.

2. An epitaxial method for the production of semi-conductor devices which comprises the steps of depositing a silicon dioxide film upon a suitably doped silicon substrate slice, etching a hole in the silicon dioxide film through a mask, epitaxially depositing a suitably doped layer of silicon on the resulting structure, removing the silicon dioxide film and the polycrystalline over-growth thereof by immersing the structure in an etching solution, and repeating these steps as many times as desired to produce the desired device.

3. An epitaxial method for the production of semiconductor devices which comprises the steps of depositing a silicon dioxide film upon a p-type silicon substrate slice, etching a hole in the silicon dioxide film through a mask, epitaxially depositing an n-type layer of silicon on the resulting structure, removing the silicon dioxide film and the polycrystalline over-growth thereof by immersing the structure in an etching solution, and repeating these steps as many times as desired to produce the desired device.

4. An epitaxial method according to claim 1, wherein a collector, an emitter and a base area are made by repeating the steps to produce a transistor.

5. An epitaxial method according to claim 1, wherein two spaced contact pads and a connecting layer of a resistance path are made by repeating the steps to produce a resistor.

6. An epitaxial method according to claim 1, wherein a base contact area and double deposit of suitably doped semiconductor is formed on top of the base area by repeating the steps to produce a diode.

7. The method according to claim 1 wherein the substrate slice is silicon.

8. The method according to claim 1 wherein at least one of the subsequently deposited epitaxial layers is of reduced area to provide an access area of the preceding epitaxial layer for attachment of leads.

References Cited

UNITED STATES PATENTS

| | | | |
|---|---|---|---|
| 3,012,920 | 12/1961 | Christensen et al. | 156—11 |
| 3,089,793 | 5/1963 | Jordan et al. | |
| 3,156,591 | 11/1964 | Hale et al. | |
| 3,206,339 | 9/1965 | Thornton | 148—175 |
| 3,265,542 | 8/1966 | Hirshon | 148—175 |

JACOB H. STEINBERG, *Primary Examiner.*

A. WYMAN, *Examiner.*